United States Patent [19]

Ueshima et al.

[11] 4,021,510
[45] May 3, 1977

[54] CYANO-SUBSTITUTED NORBORNENE POLYMERS BLENDED WITH POLYVINYL CHLORIDE RESINS

[75] Inventors: Takashi Ueshima, Yokohama; Yasuzi Tanaka; Toshiro Yokoyama, both of Kawasaki; Shoichi Kobayashi, Yokohama, all of Japan

[73] Assignee: Showa Denko Kabushiki Kaisha, Tokyo, Japan

[22] Filed: Mar. 19, 1974

[21] Appl. No.: 452,623

[30] Foreign Application Priority Data

Sept. 19, 1972 Japan .......................... 47-93273
Oct. 4, 1973 Japan .......................... 48-110957
Oct. 5, 1973 Japan .......................... 48-111526

[52] U.S. Cl. .......................... 260/891; 260/876 R; 260/893; 260/897 C; 260/898; 260/899; 260/901; 526/281; 526/282
[51] Int. Cl.² .................. C08L 27/06; C08L 33/18; C08L 51/04
[58] Field of Search ..... 260/898, 899, 891, 88.7 R, 260/88.7 A

[56] References Cited

UNITED STATES PATENTS

| | | |
|---|---|---|
| 2,721,189 | 10/1955 | Anderson et al. ............ 260/93.5 R |
| 3,277,036 | 10/1966 | Whitworth et al. ........... 260/88.1 R |
| 3,287,327 | 11/1966 | Zutty ............................ 260/88.1 R |
| 3,330,815 | 7/1967 | McKeon et al. .............. 260/88.1 R |
| 3,715,342 | 2/1973 | Colomb et al. ............... 260/88.1 R |
| 3,784,581 | 1/1974 | Boyer ........................... 260/45.9 R |
| 3,856,758 | 12/1974 | Veshima et al. .............. 260/78.4 N |

OTHER PUBLICATIONS

Michelotti et al., Journal of Polymer Science (1965) part A, vol. 3, pp. 895–905.

*Primary Examiner*—Murray Tillman
*Assistant Examiner*—Thurman K. Page
*Attorney, Agent, or Firm*—Carroll F. Palmer

[57] ABSTRACT

A resin composition is prepared from 5 to 95 parts by weight of a polymer prepared by ring-opening polymerization of cyano-substituted norbornene derivatives having at least one nitrile group or substituents including nitrile group and 95 to 5 parts by weight of (a) homopolymer or copolymer of vinyl chloride, (b) styrene homopolymer or vinyl copolymer containing at least 50 per cent by weight of at least one vinyl compound selected from the group consisting of styrene, acrylonitrile and methyl methacrylate, (c) said homopolymer or copolymer compounded with elastomer, or (d) graft copolymer obtained by grafting at least one of said vinyl compounds to said elastomer.

3 Claims, No Drawings

CYANO-SUBSTITUTED NORBORNENE POLYMERS BLENDED WITH POLYVINYL CHLORIDE RESINS

This invention relates to resin compositions containing a polymer prepared by ring-opening polymerization of cyanosubstituted nonbornene derivatives and presenting various prominent properties. An article by R. E. Rinechart appearing in the Journal of Polymer Science (1969) Part C, No. 27, pages 7 to 25 and the Japanese Pat. Publications Nos. 22705/67 and 7552/68 point out that a new type of polymer can be obtained by subjecting to ring-opening polymerization cycloolefins such as cyclooctene, cyclopentene, cyclobutene, cyclooctadiene and norbornene in an organic solvent selected from aromatic hydrocarbons such as toluene, aliphatic hydrocarbons such as n-heptane and lower alcohols such as methyl alcohol, using a catalyst prepared from halides of noble metals such as ruthenium, osmium and iridium or halides of transition metals such as titanium, molybdenum, tungsten and vanadium.

However, a joint report by Francis W. Michelotti and William P. Keaveney appearing in the Journal of Polymer Science (1965), Part A, vol. 3, pages 895 to 905 discloses that 5-chloromethyl-2-norbornene, a derivative of norbornene, can indeed be formed into fibrous polymer when subjected to ring-opening polymerization, using a catalyst of ruthenium compounds, whereas 5-cyano-2-norbornene, namely, 5-cyanobicyclo[2, 2, 1]-heptene-2, can not provide a polymer even when subjected to ring-opening polymerization, using a catalyst of compounds of ruthenium, osmium or iridium. As seen from the foregoing description, some of the derivatives of cycloolefins, particularly those of norbornene can be made into polymers by ring-opening polymerization, using a certain kind of a catalytic system, whereas the others of said norbornene derivatives can not be expected to admit the ring-opening polymerization even when the same kind of catalytic system is used.

The present inventors have conducted studies on the ringopening polymerization of cyano-substituted norbornene derivatives. As the result, it has been found that polymers can be prepared by ring-opening polymerization of cyano-substituted norbornene derivatives, using a catalyst system consisting of compounds of tungsten and/or those of molybdenum and organic aluminium compounds. It has also been disclosed that said polymer can not be produced by ring-opening polymerization of cyano-substituted norbornene derivatives, using a catalytic system consisting of compounds of titanium and/or those of vanadium and organic aluminium compounds. (U.S. Pat. No. 3,856,758).

The above-mentioned polymers prepared by ring-opening polymerization of cyano-substituted norbornene derivatives can be manufactured on an industrial scale and have not only more excellent mechanical properties such as impact strength and hardness, but also transparency and moldability than commonly used synthetic resins such as polypropylene and polyvinyl chloride, thus admitting of application in the various form, for example, containers or films by such working process as injection molding or extrusion molding customarily practised in the field of synthetic resins.

On the other hand, vinyl chloride polymers characterized by, for example, prominent tensile strength, hardness and heat resistance enjoy rapidly increasing demand. Moreover in recent years, considerable improvements have been made in the relatively low impact strength or weak point of rigid vinyl chloride resin, rendering said resin widely acceptable in various fields. However, where it is tried to elevate the impact strength of vinyl chloride polymers by compounding another type of polymer, for example, chlorinated polyethylene with said vinyl chloride polymers, there arises the disadvantages of noticeably decreasing the tensile strength, hardness, heat resistance and transparency characteristics of the vinyl chloride polymers, though incorporation of a relatively small amount of said chlorinated polyethylene may increase the impact strength of the vinyl chloride polymers. Further, addition of ABS resins (acrylonitrile-butadiene-styrene graft copolymers) or MBS resins (methyl methacrylate-butadiene-styrene graft copolymers) can indeed elevate the impact strength of the vinyl chloride polymers without noticeably reducing the tensile strength, hardness, heat resistance and transparency thereof. However, said addition is still accompanied with the unavoidable essential deterioration of said physical properties characterizing the vinyl chloride polymers, and moreover necessarily renders these polymers subject to the decline of workability, chemical resistance and weatherability.

As mentioned above, various vinyl chloride polymer compositions proposed to date for elimination of the drawbacks attendant on the vinyl chloride resin are indeed all characterized by improved impact strength but on the contrary, are offset by lower tensile strength, hardness, heat resistance and transparency. Therefore, the hitherto proposed vinyl chloride polymer compositions are not possessed of all the abovementioned properties demanded of moldable resins when said compositions are going to be put to industrial application. Therefore, strong demand has been made for the development of a new type of vinyl chloride polymer composition which can display all said properties. From this point of view, polymers of the above-mentioned cyano-substituted norbornene derivatives which have a higher impact strength than vinyl chloride polymers are expected to be utilized for improvement of the properties of the vinyl chloride polymers.

Though possessed of many superior properties to other synthetic resins in common use, the above-mentioned polymers prepared by ring-opening polymerization of cyano-substituted norbornene derivatives can not always be deemed to present satisfactory workability and impact strength when molded into, for example, mechanical parts, window frames, helmets and light covers (such as those for covers of street lamps).

The present inventors have found that incorporation of rubbery material in the polymers prepared by ring-opening polymerization of cyano-substituted norbornene derivatives can prominently elevate the impact strength thereof, and have already proposed (Japanese Pat. Publication No. 100500). However, addition of such rubbery material is still accompanied with the drawback of decreasing the tensile strength of the polymers of cyano-substituted norbornene derivatives, though increasing the impact strength thereof.

The customary practice of improving the workability of general synthetic resins is either to reduce the molecular weight thereof or to add a plasticizer well miscible therewith. However, these processes have the disadvantage of lowering the tensile strength, hardness and softening point of synthetic resins, though increasing the workability thereof.

It is accordingly the object of this invention to provide synthetic resin compositions which are free from the aforesaid difficulties accompanying the prior art and can display excellent impact strength, workability and so on.

The resin compositions of this invention are characterized by comprising 5 to 95 parts by weight of polymers prepared by ring-opening polymerization of cyano-substituted norbornene derivatives and 95 to 5 parts by weight of polyvinyl chloride resins selected from the group consisting of the homopolymer and copolymers of vinyl chloride, said cyano-substituted norbornene derivatives being expressed by the general formula

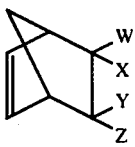

where:
W, X, Y and Z = radicals selected from the group consisting of hydrogen, a nitrile group, a substituents containing nitrile group, alkyl radicals having 1 to 20 carbon atoms, alkenyl radicals having 1 to 20 carbon atoms, aryl radicals having 6 to 20 carbon atoms and aralkyl radicals having 7 to 20 carbon atoms; and at least one of said W, X, Y and Z is the radical being selected from the group consisting of nitrile group and substituents containing nitrile group.

The polyvinyl chloride resins included in the resin composition of this invention may be replaced by (1) a styrene homopolymer or a vinyl copolymer containing at least 50 percent by weight of at least one vinyl compound selected from the grop consisting of styrene, acrylonitrile and methyl methacrylate; (2) said styrene homopolymer or vinyl copolymer compounded with at least one elastomer selected from the group consisting of butadiene rubbers, acrylic ester rubbers, chlorinated polyethylene and ethylene-propylene rubbers; and (3) graft copolymer obtained by grafting at least one of the above-mentioned vinyl compounds to said elastomer.

The resin compositions of this invention have not only prominent impact strength and workability but also heat resistance, tensile strength and hardness.

Cyano-substituted norbornene derivatives used as a monomer in this invention contain at least one nitrile group or substituent including nitrile group in the position of 5 and/or 6 of bicyclo [2, 2, 1]-heptene-2 as indicated in the following general formula representing the chemical structure of said monomer;

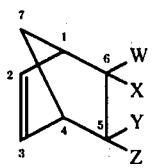

where:
W, X, Y and Z represent the aforementioned radicals.

The aforesaid a substituents containing nitrile group include the cyanomethyl radical, cyanoethyl radical, cyanopropyl radical, cyano-n-butyl radical, cyanolisobutyl radical and ω-cyano-n-heptyl radical. The hydrocarbon radicals include the methyl radical, ethyl radical, propyl radical, n-butyl radical, isobutyl radical, octyl radical, phenyl radical, cyclohexyl radical and 2-octenyl radical.

The monomers whose chemical structure may be expressed by the above-mentioned general formula can be prepared by reacting cyclopentadiene with vinyl compounds containing the nitrile group, namely, by Diels-Alder reaction (refer to an article by H. L. Holmes appearing in "Organic Reactions", Vol. 4, pages 60 to 173, published in 1948 by John Wiley and Sons, Inc.). Said monomers may also be obtained by reacting dicyclopentadiene with vinyl compounds containing the nitrile group. The vinyl compounds bearing the nitrile group which may be used in said reaction include acrylonitrile, methacrylonitrile, α-n-octyl acrylonitrile, vinylidene cyanide, fumaronitrile, maleonitrile, allylcyanide, cinnamonitrile and linolonitrile. From said vinyl compounds bearing the nitrile group are derived through the aforesaid Diels-Alder reaction, for example, 5-cyano bicyclo[2, 2, 1]-heptene-2; 5-cyano-5-methyl bicyclo[2, 2, 1]-heptene-2; 5-cyano-5-n-octyl bicyclo[2, 2, 1]heptene-2; 5, 5-dicyano bicyclo[2, 2, 1]-heptene-2; 5, 6-dicyano bicyclo[2, 2, 1]-heptene-2; 5-cyano-6-phenyl bicyclo [2, 2, 1]-heptene-2; and a mixture of 5-ω-cyano-n-heptyl, 6-n-2-octenyl bicyclo[2, 2, 1]-heptene-2 and 5-ω-cyano-2decenyl, 6-n-pentyl bicyclo[2, 2, 1]-heptene-2. The substituent may take the endo or exo position. Though the cyano-substituted norbornene derivatives consist of two groups of isomers represented by the endo and exo positions occupied by the substituent radicals, yet said different groups of isomers can be effectively separated from each other by precision distillation. The endo type isomer, for example, 5cyano-bicyclo[2, 2, 1]-heptene-2 remains solid at room temperature and has a boiling point of 88° C in an atmosphere reduced to 12 mm Hg. The exo type is a colorless liquid at room temperature, and has a boiling point of 80.5° C in an atmosphere reduced to 12 mm Hg, a density of 1.0065 g/cc at 20° C and a reflective index of 1.4862 with respect to the D line of sodium at 20° C. Said isomers can be used in a separated or nonseparated state in performing the ring-opening polymerization. It is possible to use a single or two or more types of the above-mentioned cyano-substituted norbornene derivatives.

The polymers of cyano-substituted norbornene derivatives can be prepared by ring-opening polymerization of the various types of cyano-substituted norbornene derivatives obtained by the above-mentioned process in the presence or absence of an inert organic solvent using a catalytic system consisting of a mixture of organic aluminium compounds and compounds of tungsten and/or those of molybdenum or a catalytic system consisting of said mixture to which there is added at least one compound selected from the group consisting of water, peroxides, epoxides, organic halides, acetal compounds, orthocarbonic acid esters and alcoholic compounds.

The ring-opening polymerization is effected through the following process:

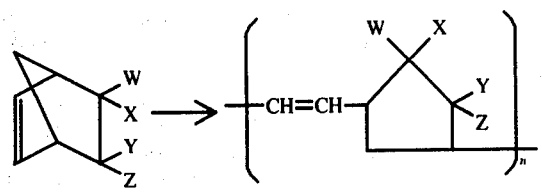

where:
W, X, Y and Z denote the aforementioned radicals.

The polymers obtained present different properties from various factors, namely, according as the double bond of the polymer is of the cis or trans type, or depending on the mutual substitution positions and steric positions of the substituents.

Cyano-substituted norbornene derivatives are sometimes likely to polymerize through their c=c double bond according to the following scheme, that is, vinyl polymerization.

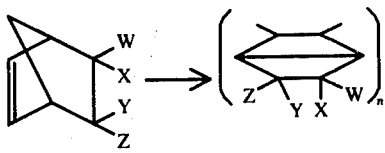

where W, X, Y and Z denote the aforementioned radicals.

However, said vinyl polymerization produces polymer with chemical structure different from the polymers used in this invention.

Organic aluminium compounds constituting a part of the catalytic system used in the ring-opening polymerization are of the type whose chemical structure may be expressed by the general formula $AlR_3$ or $AlR_n X_{3-n}$ (where R represents the alkyl or aryl radical, X denotes halogens, hydrogen or alkoxy radical and $n$ is 1, 1.5 or 2) or $AlR_3$-$H_2O$ (where the mol ratio of $H_2O$ to $AlR_3$ has a value of <1.5).

Compounds represented by $AlR_3$, are, trialkyl aluminium, e.g., trimethyl aluminium, triethyl aluminium, tri-n-propyl aluminium, triisopropyl aluminium, triisobutyl aluminium, trihexyl aluminium and trioctyl aluminium, and triaryl aluminium, such as tribenzyl aluminium and triphenyl aluminium.

Compounds denoted by $AlR_2X$ include dialkyl aluminium monohalides such as diethyl aluminium monochloride, di-n-propyl aluminium monochloride, di-isobutyl aluminium monochloride, di-n-butyl aluminium monochloride, diethyl aluminium monobromide, and diethyl aluminium monoiodide; dialkyl aluminium monohydrides such as diethyl aluminium monohydride, di-n-propyl aluminium monohydride, and di-isobutyl aluminium monohydride; diaryl aluminium monohalides such as dibenzyl aluminium monochloride, diphenyl aluminium monochloride, dibenzyl aluminium monobromide, and ditolyl aluminium monochloride; and dialkyl aluminium monoalkoxides such as diethyl aluminium monethoxide, and diisobutyl aluminium monobutoxide.

Compounds indicarted by $AlR_{1.5} X_{1.5}$ include ethyl aluminium sesquichloride, ethyl aluminium sesquibromide, and isobutyl aluminium sesquichloride.

Compounds represented by $AlRX_2$ include alkyl aluminium dihalides such as ethyl aluminium dichloride, ethyl aluminium dibromide, propyl aluminium dichloride, isobutyl aluminium dichloride, ethyl aluminium dibromide, and ethyl aluminium diiodide; aryl aluminium dihalides such as benzyl aluminium dichloride, benzyl aluminium dibromide, tolyl aluminium dichloride, and phenyl aluminium dichloride; and alkyl aluminium dialkoxides such as ethyl aluminium diethoxide.

Mixtures denoted by $AlR_3$-$H_2O$ are mixtures of trialkyl aluminium and water in which the trialkyl aluminium accounts for at least 2 mols based on 3 mols of water. Such mixtures include, for example, mixture of triethyl aluminium and water in which said triethyl aluminium and water should be in the ratio of 1:0.5.

Most preferably among the above-listed organic aluminium compounds are triethyl aluminium, triisobutyl aluminium, trihexyl aluminium, diethyl aluminium monochloride, di-n-butyl aluminium monochloride, ethyl aluminium sesquichloride, diethyl aluminium monobutoxide and a mixture of triethyl aluminium and water in which the triethyl aluminium and water bear the mole ratio of 1:0.5

Compounds of tungsten and molybdenum partly constituting the catalytic system used in the method of this invention include halides of tungsten and molybdenum such as tungsten hexachloride, tungsten pentachloride, tungsten hexafluoride, tungsten pentafluoride, molybdenum pentachloride, molybdenum hexachloride, molybdenum pentafluoride, molybdenum hexafluoride, molybdenum pentabromochloride and molybdenum pentabromide; oxyhalides of tungsten and molybdenum such as tungsten oxytetrachloride, tungsten oxytetrabromide, tungsten oxydichloride, molybdenum oxytrichloride, and molybdenum oxytetrachloride, in addition, molybdenum dioxydiacetyl acetonate $[MoO_2(CH_3COCH=C(CH_3)O-(_2$, hereinafter referred to as $MoO_2(AcAc)_2]$, tungsten hexaalcoholate, tungsten hexaphenolate, tetrachlorotungsten diphenolate, tetrachlorotungsten dialcoholate, dichloromolybdenum dialcoholate, and dichloromolybdenum triphenolate; and halides of aluminium-tungsten, for example, $Al_4W_3Cl_{18}$ obtained by reducing halides of tunsten by powders of aluminium. Most preferably among the above-listed compounds of tungsten and molybdenum are molybdenum pentachloride, tungsten hexachloride, and tungsten oxytetrachloride ($WOCl_4$). The mole ratio of organic aluminium compounds to the compounds of tungsten or molybdenum is generally more than 0.1, preferably more than 0.5. Use of less than 0.1 mol of organic aluminium compounds based on 1 mol of compounds of tungsten or molybdenum failed to attain practical polymerization activity. A catalytic system consisting of 10 mols of organic aluminium compounds based on 1 mol of compounds of tungsten or molybdenum realized an extremely high degree of polymerization activity.

While, in the ring-opening polymerization, the abovementioned binary catalytic system consisting of organic aluminium compounds and compounds of tungsten or molybdenum can effect the ring-opening polymerization of cyano-substituted norbornene derivatives, addition of a third component to said binary catalytic system to convert it into a ternary system prominently promotes the polymerization activity and further varies the properties of the polymers obtained using said binary catalytic system.

Said third component may be formed of at least one compound selected from the group consisting of water, peroxides, epoxides, organic halides, acetal compounds, alcoholic compounds, phenolic compounds, orthoformic acid esters, and orthocarboxylic acid esters. The peroxides include alkyl peroxides such as t-butyl peroxide; aryl peroxides such as benzoyl peroxide; alkyl or aralkyl hydroperoxides such as t-butyl hydroperoxide and cumene hydroperoxide; hydrogen peroxide; peracids such as peeracetic acid; and esters, ketones and aldehydes derived from said peracids. The epoxides include ethylene oxide, propylene oxide, butene oxide, epichlorohydrin, ally glycidyl ether, and butadiene monoxide. The organic halides include t-butyl hypohalite compounds; allyl halides such as allyl chloride; t-alkyl halides such as t-butyl chloride; halogenated ketones such as α-chloroacetone; and halogenated alcohols such as 2-chloroethanol. The acetal compounds include acetaldehyde diethylacetal, diethoxy methane, acetone dimethyl acetal, and dichloroacetaldehyde dimethyl acetal. The alcoholic compounds include methyl alcohol, ethyl alcohol, n-propyl alcohol, n-butyl alcohol and isobutyl alcohol.

The phenolic compounds include phenol; p-methyl phenol; p,p'-ispropylidene diphenol; 2, 6-dimethyl-phenol; p-chlorophenol; 1, 3-benzenediol and 1, 3, 5-benzenetriol. The orthoformic acid esters include methyl orthoformate and ethyl orthoformate. The orthocarboxylic acid esters include ethyl orthoacetate, n-propyl orthopropionate and butyl orthophenylacetate. Preferably among the orthocarboxylic acid esters are orthoalkyl formate and particularly orthomethyl formate and orthoethyl formate. Water is also an effective third component of the subject catalytic system. While the amount of the third component added varies with its type, its proportion is generally 0.1 to 6 mols, or preferably 0.3 to 3 mols based on 1 mol of compounds of tungsten or molybdenum.

While the amount of the subject catalytic system added to the monomer of cyano-substituted norbornene derivatives varies with the type of said monomer, etc. the compounds of tungsten or molybdenum should generally be added at the rate of 0.001 to 20 mols, or preferably 0.1 to 5 mols based on 100 mols of said monomer. Addition of more than 20 mols of the compounds of tungsten or molybdenum based on 100 mols of said monomer not only results in high cost, but also fails to promote the catalytic action, namely, such excess addition does not elevate the degree of polymerization activity. Further, if unduly large amounts of said compounds of tungsten or molybdenum are used, the reaction system will still contain, after completion of the ring-opening polymerization, such amounts of residual tungsten or molybdenum compounds as will be difficult to eliminate. The presence of said catalytic component in the polymer obtained will undesirably color the polymer. Said coloration increases the tint of a resin composition containing such colored polymer in the subsequent molding operation, giving rise to the thermal deterioration of the resultant product.

As previously mentioned, the ring-opening polymerization of cyano-substituted norbornene derivatives can be carried out using the previously described catalytic system with or without an inert organic solvent. Said inert organic solvent is preferred to be the type which does not harmfully affect the catalytic system. Typical of said solvents are aliphatic hydrocarbons such as pentane, heptane, hexane, petroleum ether and decane; aromatic hydrocarbons such as benzene, toluene and xylene; alicyclic hydrocarbons such as cyclohexane, decaline and cyclooctane; halogenized hydrocarbons such as methylene chloride; 1,2-dichloroethane, 1,2-dichloropropane, chloroform, chlorobenzene and carbon tetrachloride; and ethers such as diethyl ether and tetrahydrofuran. The above-listed inert organic solvents may be used along or in combination.

The catalytic components, monomer (cyano-substituted norbornene derivatives) and inert organic solvent (if used) may be added in various sequential orders. The typical sequence is to add first the inert organic solvent, secondly the monomer, thirdly the components of tungsten or molybdenum, fourthly the third component (if used), and finally organic aluminium compounds. It is also possible to mix the desired compounds among the catalytic components, monomer and solvent or heat them separately before they are used in the ring-opening polymerization.

The object of the ring-opening polymerization can be fully attained, as previously described, by the ring-opening polymerization of cyano-substituted norbornene derivatives in the presence of a catalytic system consisting of compounds of tungsten and/or those of molybdenum and organic aluminum compounds or a mixture of said both types of compounds and the aforesaid third component. Yet, the molecular weight of the resultant polymer can be controlled by adding to the polymerization system α-olefins such as ethylene, propylene, butene-1 and hexene-1; internal oelfins such as butene-2 and hexene-2; conjugated diolefins such as butadiene and isoprene; or nonconjugated diolefins such as 1,4-hexadiene. In this case, it is generally advised to add 0.01 to 10 parts by weight of said molecular weight controlling agent based on 100 parts by weight of the monomer of cyano-substituted norbornene derivatives.

As previously mentioned, the polymer can be obtained by the ring-opening polymerization of the subject monomer in the presence of inert organic solvent or in the absence of said solvent (bulk polymerization). If used, said inert organic solvent is generally preferred to be added at the rate of 1 to 10 parts by volume based on 1 part volume of the monomer.

The ring-opening polymerization is carried out generally at a temperture ranging from −100° C to +200° C or preferably −40° C to 100° C. At a lower temperature than −100° C, the reaction system does not display desirable polymerization activity with the resultant extremely slow progress of polymerization. In such case, progress of the polymerization consumes a great deal of time, sometimes causing a mixture of the inert organic solvent and monomer to be solidified. Conversely, a higher temperature than 200° C fails to provide a good quality of polymer prepared by ring-opening polymerization, and is practically undesirable.

The ring-opening polymerization is preferred to take place in an inert atmosphere such as, argon and nitrogen. If oxygen and moisture are present in the reaction system, then the catalytic components i.e., the organic aluminium compounds and the compounds of tungsten or molybdenum will be changed to construct the reproducibility of said polymerization.

The elimination of the catalyst residue and the recovery of the polymer produced after completion of the ring-opening polymerization may be effected by the processes customarily used in the solution polymerization of isoprene and butadiene. Namely, when a solution resulting from the ring-opening polymerization, that is, a solution containing the polymer obtained by said polymerization, the unreacted portion of the monomer and the catalyst residue into lower alcohol, for example, methyl alcohol or ethyl alcohol containing a small amount of hydrochloric acid, then the catalyst residue will be eliminated and the polymer produced will be precipitated at the same time. The object of the elimination of the catalyst residue and the recovery of the polymer can be further achieved by first uniformly diluting the solution resulting from the ring-opening polymerization using solvent immiscible with water, for example, methylene chloride, then by treating said solution with water containing a chelating agent such as nitrilotriacetic acid or ethylene diamine tetraacetic acid to eliminate the catalyst residue and afterwards by recovering the polymer and the organic solvent by the steam stripping process.

The polymers prepared by ring-opening polymerization of cyano-substituted norbornene derivatives include not only homopolymers of cyano-substituted norbornene derivatives obtained by the above-mentioned process but also copolymers prepared by the ring-opening polymerization of a mixture of the cyano-substituted norbornene derivatives as a main component and other cycloolefinic compounds which is carried out in the same manner as in producing the homopolymers of said cyano-substituted norbornene derivatives.

Other cycloolefinic compounds used as comonomers in producing the above-mentioned copolymers typically include monocyclic olefins such as cyclopentene, cycloheptene and cyclododecene; nonconjugated cyclopolyenes such as 1,5-cyclooctadiene; 1,5,9-cyclododecatriene; 1-chloro-1,5-cyclooctadiene and norbornadien; ester type norbornene derivatives such as 5-methoxycarbonyl-5-methyl-bicyclo [2,2,1]-heptene-2; 5-acetoxy-bicyclo [2,2,1]-heptene-2; 5,6-dimethoxycarbonylbicyclo[2,2,1]-heptene-2 and 5-ω-carbomethoxy-n-heptyl-6-n-octyl-bicyclo [2,2,1]-heptene-2; ether type norbornene derivatives such as 5-methoxy-bicyclo [2,2,1]-heptene-2; 5-ethoxybicyclo [2,2,1]-heptene-2; 5-cyclohexoxy-bicyclo [2,2,1]-heptene-2; 5-methoxymetyl-bicyclo [2,2,1]-heptene-2; 5-methoxy-6-methoxymethyl bicyclo [2,2,1]-heptene-2, and 5-phenoxy-bicyclo [2,2,1]-heptene-2; acid anhydride type norbornene derivatives such as 3,6-methylene-1,2,3,6-tetrahydro-cisphthalic anhydride; 6-(5-carboxy-bicyclo [2,2,1]-2-heptenyl) acetic anhydride; 4,7-methyl-1,2,3,3a, 4,7,7a,8-naphthalene-1,2-dicarboxylic anhydride and 4-(bicyclo [2,2,1]-2-heptenyl) phthalic anhydride; imide type norbornene derivatives such as N-methyl-3,6-methylene-1,2,3,6-tetrahydro-cis-phthalimide; N-methyl-3,6-methylene-1-methyl-1,2,3,6-tetrahydro-cis-phthalimide; bicyclo [2,2,1] hepta-2-ene-5-spiro-3'-(n-ethyl succinimide); 2-methyl-2-aza-1,3-dioxo-5,8-methano-1,2,3,4,4a,5,8,8a-octahydronaphthalene; N-ethyl-5,8-methano-1,2,3,4,4a,5,8,8a-octahydronaphthalene-2,3-dicarboxyimide; N-methyl-4-(5-norborna-2-enyl) phthalimide; N-(5-norborna-2-enyl) methylmaleimide; N-(5-norborna-2-enyl) methyl-citraconimide and N-(5-norborna-2-enyl) methyl-naphthalene-2,3-dicarboxyimide; aromatic norbornene derivatives such as 1,4-dihydro-1,4-methanonaphthalene; 1,4-dihydro-1,4-methano-6-methylnaphthalene; 1,4-dihydro-1,4-methano-6-methoxycarbonyl naphthalene; 6-chloro-1,4-dihydro-1,4-methanonaphthalene; 5,8-diacetoxy-6,7-dichloro-1,4-dihydro-1,4-methanonaphthalene; 5,8-diacetoxy-1,4-dihydro-1,4-methano-6-methylnaphthalene; 5,8-diacetoxy-1,4-dihydro-6,7-dimethoxy-1,4-methanonaphthalene; 1,4-dihydro-1,4-methanonanthracene; 9,10-diacetoxy-1,4-dihydro-1,4-methanoanthracene and 1,4-dihydro-9,10-diphenyl-1,4-methanoanthracene; polar group-bearing norbornene derivatives, for example, halogen type norbornene derivatives such as 5-chloro-bicyclo [2,2,1]-heptene-2; 5,5-dichloro-bicyclo [2,2,1]-heptene-2 and 5,6-dichloro-bicyclo [2,2,1] heptene-2; and bicyclo [2,2,1]-heptene-2 (norbornene).

Where the above-mentioned copolymers of cyano-substituted norbornene derivatives are used in producing the resin compositions of this invention, it is preferred that said copolymers be formed by ring-opening polymerization of a mixture containing one mol at most of other cycloolefinic compounds based on one mol of cyano-substituted norbornene derivatives. Where said other cycloolefinic compounds, for example monocyclic olefins such as cyclopentene and cyclooctene are used at the rate of more than one mol based on one mol of cyano-substituted norbornene derivatives, then the resin composition containing the resultant copolymers will have lower surface hardness and softening point.

Where the homopolymer or copolymer of the cyano-substituted norbornene derivatives (hereinafter simply referred to as "polymers of cyano-substituted norbornene derivatives") is homogeneously mixed with vinyl chloride resins, then there can be obtained resin compositions which have not only high tensile strength, hardness, and transparency characteristic of the vinyl chloride resins, but also additionally prominent impact strength and improved heat resistance.

Incorporation of the polymers of cyano-substituted norbornene derivatives displays a very noticeable effect, though the functional mechanism still remains to be known. It is assumed that said polymers have good compatibility with vinyl chloride resins and both components display the desired effect due to their unexpected synergetic function.

The vinyl chloride resins in which the polymers of cyano-substituted norbornene derivatives are to be incorporated may be prepared by any of bulk polymerization, solution polymerization, emulsion polymerization and suspension polymerization. For the object of this invention, it is possible to use not only homopolymer of vinyl chloride, but also copolymers consisting of said vinyl chloride as a main component and vinyl acetate, ethylene, propylene or vinyl ether. However, use of the homopolymer of vinyl chloride, particularly use of the homopolymer having a high average degree of polymerization, provides desired resin compositions having higher impact strength than those prepared by the above-mentioned copolymers. It will be noted that where said vinyl chloride copolymers are used, the subject resin composition tends to be less increased in impact strength conversely with the larger proportions of compounds copolymerized with vinyl chloride.

The above-mentioned resin compositions may be prepared from such proportions of components as are selected in view of the quality of intended practical articles as well as from economic consideration. Said resin compositions are chosen to consist of 95 to 5, preferably 90 to 20 parts by weight of vinyl chloride resins and 5 to 95, preferably 10 to 80 parts by weight of polymers of cyano-substituted norbornene derivatives. The reason is that smaller proportions of said polymers of cyano-substituted norbornene derivatives than 5 parts by weight fail to elevate the impact strength of the subject vinyl chloride resin and larger proportions of said derivatives than 95 parts by weight have the disadvantage of rendering the resin compositions easily inflammable.

The aforesaid resin compositions are not only improved in the low impact strength, the significant defect of vinyl chloride resins, but also display high tensile strength, hardness, heat resistance, transparency, solvent resistance fire retardancy and gas barrier properties.

A mixture of the polymers of cyano-substituted norbornene derivatives prepared by the aforesaid process with the styrene homopolymer or vinyl copolymers containing at least 50 percent by weight of at least one vinyl compound selected from the group consisting of styrene, acrylonitrile and methyl methacrylate (the styrene homopolymer and the vinyl copolymers are jointly referred to as "vinyl compound resins") enables the resultant resin composition to have good workability.

The vinyl compound resins mixed with the polymers of cyano-substituted norbornene derivatives in making the abovementioned resin compositions of good workability are prepared by polymerizing at least one vinyl compound (monomer) selected from the group consisting of styrene, acrylonitrile and menthylmethacrylate by any or combination of bulk polymerization, solution polymerization, emulsion polymerization and suspension polymerization using a radial initiator, for example, organic peroxide as a polymerization initiator. The vinyl compound resins include the styrene homopolymer, acrylonitrile-styrene copolymer, methyl methacrylate-styrene copolymer, copolymers consisting of methyl methacrylate as a main component and other monomers and acrylonitrile-styrene-methyl methacrylate terpolymer. The vinyl compound resins are manufactured by the known industrial process and widely accepted. The aforesaid homopolymer and copolymers have a molecular weight generally ranging between 100,000 to 500,000, and a melt viscosity of $10^2$ to $10^5$ poises as measured by the Koka type flow tester provided with a nozzle 1 mm in diameter and 10 mm long under a load of 100 kg at a temperature of 200° C.

The styrene homopolymer generally has a molecular weight of 200,000 to 500,000, melt viscosity of $10^2$ to $10^5$ poises, flow rate (Q) of $5 \times 10^{-1}$ to $10^{-2}$ as measured by the Koka type flow tester provided with a nozzle 1 mm in diameter and 10 mm long under a load of 100 kg at a temperature of 200° C and intrinsic viscosity of 0.7 to 0.9. The methyl methacrylate copolymers consisting of methyl methacrylate as a main component and other monomers have a melt viscosity of $10^3$ to $10^5$ poises. The acrylonitrile-styrene copolymers generally contain at most 40 percent by weight of acrylonitrile and have a melt viscosity of $10^3$ to $10^5$ poises. The methyl methacrylate-styrene copolymers consist of 1 to 99 percent by weight of methyl methacrylate and 99 to 1 percent by weight of styrene and have a melt viscosity of $10^2$ to $10^5$ poises. The acrylonitrile-styrene-methyl methacrylate terpolymer consists of 1 to 40 percent by weight of acrylonitrile and 99 to 60 percent by weight of a mixture of styrene and methyl methacrylate, and has a melt viscosity of $10^2$ to $10^5$ poises, the styrene content of said mixture accounting for 1 to 99 percent by weight.

The subject resin compositions of good workability consist of 5 to 95 parts by weight of the polymers of cyano-substituted norbornene derivatives and 95 to 5 parts by weight of the vinyl compound resins. Large proportions of the vinyl compound resins tend to produce the softening point and surface hardness of the resultant resin composition, though elevating the workability thereof. Where, therefore, it is desired to obtain a resin composition used in the application where said composition is demanded to have a high softening point and surface hardness, it is preferred that said resin composition be formed of 60 to 95 parts by weight of the polymers of cyano-substituted norbornene derivatives and 40 to 5 parts by weight of the vinyl compound resins. The vinyl compound resins, namely styrene homopolymer and vinyl copolymers may be respectively used alone or in combination. Of course, it is possible to blend styrene homopolymer with one or more kinds of vinyl copolymer.

Where necessary, the subject resin compositions of good workability may be blended with thermoplastic resin such as the homopolymer or copolymers of vinyl chloride and terpolymers of acrylonitrile-butadiene-styrene and rubbery material such as butadiene rubbers, chlorinated polyethylene and polychloroprene rubbers.

The vinyl compound resins in which the polymers of cyanosubstituted norbornene derivatives are to be incorporated may be replaced by a mixture of said vinyl compound resins and elastomer so as to render the resultant resin composition particularly impact-resistant. The high impact strength of the resin composition may also be attained by using the graft copolymers obtained by grafting vinyl compounds to the abovementioned elastomer instead of usig the mixture of elastomer and vinyl compound resins.

The elastomer includes butadiene rubbers, acrylic esters rubbers, chlorinated polyethylene and ethylene-propylene rubbers. The elastomer may be used alone or in combination.

The butadiene rubbers consist of butadiene rubber (butadiene homopolymer) or styrene-butadiene rubber or acrylonitrile-butadiene rubber (a copolymer of butadiene as a main component and styrene or acrylonitrile). Said copolymer may be random block copolymer. The acrylic esters rubbers may include a copolymer prepared from acrylic esters as a main component and a small amount of, for example, acrylonitrile. These rubbers may be produced by emulsion polymerization. Chlorinated polyethylene is prepared by chlorinating ethylene homopolymer of high density ranging from 0.93 to 0.97 g/cc or an ethylene-α-olefin copolymer in a solvent or aqueous suspension. The chlorine content of the chlorinated polyethylene is generally 25 to 45 percent by weight. The ethylene-propylene rubbers are obtained by copolymerizing a mixture of ethylene and propylene or said mixture containing a small amount of linear or branched diolefin having two double bonds at the chain ends such as 1,4-pentadiene; 1,5-hexadiene and 3,3-dimethyl-1,5-hexadiene, or linear or branched diolefin having a single double bond at the chain end such as 1,4-hexadiene and 6-methyl-1,5-heptadiene, or cyclic diene compounds such as 5-ethylidene bicyclo [2,2,1]-heptene-2. The ethylenepropylene rubbers are preferred to be a type in which the monomer unit of ethylene bears a weight ratio of 35 : 65 to 65 : 35 to that of propylene. All the above-mentioned rubbers or elastomer are prepared on an industrial scale by copolymerizing the components using a catalyst mainly consisting of organic aluminum compounds and transistion metal compounds, and are widely accepted in various fields.

The mixture of vinyl compound resins and elastomer mixed with the polymers of cyano-substituted norbornene derivatives in making the resin compositions of particularly high impact strength consists generally of 98 to 70 parts by weight of the vinyl compound resins and 2 to 30 parts by weight of the abovementioned elastomer.

The above-mentioned graft copolymers used in this invention can be produced by grafting at least one vinyl compound selected from the group consisting of styrene, acrylonitrile and methyl methacrylate to the aforesaid elastomer. Said grafting may be effected by any of bulk polymerization, solution polymerization, emulsion polymerization and suspension polymerization or a combination thereof (for example, a combination of bulk polymerization and suspension polymerization).

The graft copolymers produced by the above processes typically include high impact styrene resin prepared by grafting styrene to butadiene rubber or styrene-butadiene rubber acrylonitrile-butadiene-styrene terpolymer (ABS resin) obtained by grafting styrene and acrylonitrile to butadiene rubber, styrene-butadiene rubber or acrylonitrile-butadiene rubber (nitrile rubber); methyl methacrylate-butadiene-styrene terpolymer prepared by grafting styrene and methyl methacrylate to butadiene rubber, or styrene-butadiene rubber; acrylonitrile-acrylic ester-styrene terpolymer (AAS resin) formed by grafting stryrene and acrylonitrile to acrylic esters rubbers namely acrylic rubbers (copolymer of acrylic esters as a main component and a small amount of, for example, acrylonitrile); graft copolymers (ASC resin) obtained by grafting acrylonitrile and styrene to chlorinated polyethylene (CPE); and graft copolymers (AES resin) formed by grafting acrylonitrile and styrene to ethylene-propylene rubber (ethylenepropylene copolymer; EPR or EPM) or ethylene-propylene terpolymer (EPT or EPDM). All these graft copolymers are mostly manufactured on an industrial scale by the known process.

The mixture consisting of styrene homopolymer and elastomer or vinyl copolymers and elastomer, as well as graft copolymers, may respectively be used or in combination. Or said mixture and graft copolymers may be used jointly.

The subject resin compositions of high impact strength are chosen to consist of 5 to 95 or preferably 30 to 95 parts by weight of the polymers of cyano-substituted norbornene derivatives and 95 to 5 or preferably 70 to 5 parts by weight of the elastomer blended with the styrene homopolymer or with the vinyl copolymers or the latter proportions of the graft copolymers.

The resin compositions of the invention thus prepared have not only high impact strength, but also large tensile strength hard surface hardness and high softening point or heat resistance.

If necessary, said resin compositions of high impact strength may further be blended with synthetic resins such as the homopolymer or copolymers of vinyl chloride and methyl methacrylate resins (PMMA resin) or elastomer such as acrylonitrile-butadiene rubber (NBR), or butadiene rubber, styrene-butadiene rubber, chlorinated polyethylene, chlorosulfonated polyethylene, ethylene-propylene rubber, ethylenepropylene terpolymer, chloroprene rubber (CR) and acrylic rubber.

The constituents of the resin compositions of the invention are generally mixed by a dry blender such as a ribbon blender, rotary cone mixer, rotary mixer or Henschel mixer. However, a mixer such as a hot roll mixer, Banbury mixer or melt extruder is convenient, because it can mix the above-mentioned constituents in a molten state homogeneously with relative ease. Further depending on the kinds of said constituents, the process can be suitably adopted which consists in adding a contituent to a solution in which other constituent is dissolved or an aqueous or organic suspension in which other constituent is kept in a suspended state and thereafter distilling out water or an organic solvent for their uniform mixing.

The subject resin composition consisting of vinyl chloride resins and the polymers of cyano-substituted norbornene derivatives can be prepared by mixing both components without applying any particular method and consuming any long time.

When said components are mixed, a stabilizer is added, as is usually the case, to prevent the decomposition or deterioration of various constituent polymers, particularly vinyl chloride resin by heat, oxygen, light (ultraviolet rays) or ozone. The stabilizer includes organic tin compounds such as dibutyltin maleate, and dibutyltin dilaurate, lead compounds such as basic lead phosphite, organic acid salts such as calcium stearate and cadmium stearate, epoxy compounds and phenol compounds. However, application of organic tin compounds is desired to maintain the transparency of the subject resin composition.

It is possible to incorporate various additives used with general resins such as, fire retardant, plasticizer, lubricant, reinforcing agent, filler, antistatic agent, electric property improver, ultraviolet absorbent, foaming agent and coloring agent in the resin compositions of this invention. Said incorporation is also included in this invention.

The resin composition of this invention can be molded by compression molding, extrusion molding, injection molding, blow molding and casting applied to general types of synthetic resin into various products such as sheets, boards, rods, pipes, films including secondary worked articles, for example, bags, packing material, various containers, electrical parts including illumination implements, daily sundry goods, furniture, toys, agricultural tools, machine parts, etc.

This invention will be more fully understood with reference to the examples and controls which follow. Throughout the examples and controls, the Vicat softening point was determined with a test piece 3 mm thick by measuring the temperature (° C) at which a needle was inserted 1 mm into the test piece by the Vicat softening point testing method set forth in ASTM D-1525-58T. The Rockwell hardness represents a value of the surface hardness (R) of the test piece measured at 20° C pursuant to ASTM D-785-51. The Izod impact strength was measured by using a notched test piece 3 mm thick in a thermostat at 20° C according to ASTM D-256-56. The tensile strength denotes a value measured by stretching a No. 3 dumbbell shaped test piece 1 mm thick specified in JIS (Japanese Industrial Standard) at a speed of 5 cm/min in a thermostat at 20° C. The melt viscosity was measured by subjecting the resin to a load of 100 kg at 200° C using the Koka type flow tester provided with a nozzle 1 mm in diameter and 10 mm long.

EXAMPLES 1 TO 4 AND CONTROLS 1 TO 4

A dried nitrogen-filled 10 l autoclave was charged with 4500 ml of 1,2-dichloroethane, 1500 ml (12 mol) of 5-cyano-bicyclo [2,2,1]-heptene-2 (cyanonorbornene) monomer, 10.1 ml of n-hexene-1 (0.12 mol) and 120 ml of a 1,2-dichloroethane solution containing 0.2 mol of hexachlorotungsten-acetaldehyde diethylacetal (both components bear a molar ratio of 1:2 and the hexachlorotungsten amounts to 24 millimols, namely, accounts for 0.2 mol% based on the above-mentioned monomer). The reaction system was heated to 70° C. 11.9 ml (96 millimols) of diethyl aluminium chloride was added to the reaction system. After polymerization was conducted for 5 hours with stirring, the reaction system was treated with 200 ml of ethanolamine and 10 g of bis (2-hydroxy-3-t-butyl-5-methyl phenyl) methane (manufactured by Yoshitomi Chemicals Mfg. Co. under the trade name "Yoshinox 2246") as a stabilizer. The mass was further stirred for 30 minutes at the same temperature. The resultant system (or a solution containing the polymer produced) was diluted with 1,2-dichloroethane (said polymer has a concentration of about 10% by weight). 4000 ml of an aqueous solution containing 1% by weight of trisodium salt of nitrilotriacetic acid was added, followed by vigorous stirring for 30 minutes at 20° C. After allowed to stand, the mass was separated into a phase of water and that of the 1,2-dichloroethane, followed by removal of the water phase. After this operation was repeated three times, water washing was carried out. When the pH of the solution was determined to be 7, the polymer was precipitated for separation by addition of a large amount of methyl alcohol. The polymer thus purified was dried overnight at 50° C in vacuum of less than 1 mmHg, providing 1150 g of substantially colorless transparent polymer. The conversion rate accounted for 80 percent of the raw monomer. The product polymer had an intrinsic viscosity of 0.64, Izod impact strength of 2.3 ft. 16/inch-notched, Vicat softening point of 133° C, Rockwell hardness R of 122 and melt viscosity of 8.6 × 10⁵ poises.

The 5-cyano-bicyclo [2,2,1]-heptene-2 polymer (polycyanorbornene) prepared by ring-opening polyermization in the above-mentioned manner was added to polyvinyl chloride (manufactured by Kureha Chemical Industry Co., Ltd. under a trade name "Kureha S901") in the proportion given in Table 1. Both components were kneaded about 5 minutes on an 8 inch roll heated to 175° C. At this time, 3 parts by weight of dibutyltin maleate was added as a stabilizer based on 100 parts by weight of the total amount of resin. The kneaded resin was molded in a press at 190° C, and immediately transferred to a watercooled press for cooling to prepare required test pieces. Tests were made thereon for the Vicat softening point, hardness, Izod impact strength, tensile strength and transparency, the results being set forth in Table 1. By way of comparison, the same tests were carried out on polyvinyl chloride (commercially known as a trade name of "Kureha S901") alone, mixed resins prepared by blending said polyvinyl chloride with chlorinated polyethylene (manufactured by Showa Denko K.K. under a trade name "Elaslen") containing 30 % of chlorine or ABS resin (manufactured by Kanegafuchi Kagaku K.K. under a trade name "Kaneace") and polycyanonorbornene alone, the results being given in Table 1.

Table 1

|  | Blending ratio (parts by weight) | | | | Vicat Sofening point (° C) | Izod impact strength (ft.lb/inch-notched) | Hardness (R) | Tensile strength (kg/cm²) | transparency |
| --- | --- | --- | --- | --- | --- | --- | --- | --- | --- |
|  | PVC⁽¹⁾ | PCN⁽²⁾ | CPE⁽³⁾ | ABS⁽⁴⁾ | | | | | |
| Example 1 | 80 | 20 | — | — | 96 | 1.5 | 116 | 530 | good |
| 2 | 60 | 40 | — | — | 115 | 2.3 | 119 | 540 | good |
| 3 | 40 | 60 | — | — | 122 | 2.3 | 120 | 530 | good |
| 4 | 20 | 80 | — | — | 127 | 2.3 | 121 | 540 | good |
| Control 1 | 100 | — | — | — | 91 | 0.8 | 115 | 540 | good |
| 2 | — | 100 | — | — | 133 | 2.3 | 122 | 510 | good |
| 3 | 80 | — | 20 | — | 85 | 12.5 | 108 | 370 | opaque |
| 4 | 80 | — | — | 20 | 86 | 11.0 | 101 | 460 | good |

Note:
⁽¹⁾Polyvinyl chloride
⁽²⁾Polycyanonorbornene
⁽³⁾Chlorinated polyethylene
⁽⁴⁾ABS resin

EXAMPLE 5

100 parts by weight of 5-cyano-bicyclo [2,2,1]-heptene-2 polymer prepared by ring-opening polymerization using the same method as applied in Example 1, 20 parts by weight of polystyrene (manufactured by Japan Polystyrene Mfg. Co. under a trade name "Esbrite" No. 2) having a melt viscosity of 1.2 × 10³ poises, Izod impact strength of 10 Kg.cm/cm-notched, Vicat softening point of 78.9 ° C and Rockwell hardness R of 118 and 0.5 part by weight of bis (2-hydroxy-3-t-butyl-5-methyl phenyl) methane as a stabilizer were kneaded together 5 minutes on a hot roll mill heated to 175° C. The mixture thus obtained was hot pressed 3 minutes at a pressure of 100 kg/cm² at 200° C, and further pressed 3 minutes at a pressure of 100 kg/cm² with a water cooled press to form a plate 3 mm thick. This plate had an impact strength of 3.3 kg.cm/cm-notched, Rockwell hardness R of 120. The above-mentioned mixture had a melt viscosity of 3.0 × 10⁵ poises and Vicat softening point of 121° C.

EXAMPLE 6

The same kind of mixture as in Example 5 was obtained by using a hot roll mill in the same way as in Example 5, excepting that the proportion of polystyrene was changed to 50 parts by weight. The mixture was further pressed into a plate by a hot press and a water cooled press as in Example 5. The product plate had an Izod impact strength of 2.4 kg.cm/cm-notched and Rockwell hardness R of 120. The above-mentioned mixture had a melt viscosity of $1.6 \times 10^4$ poises and Vicat softening point of 114° C.

EXAMPLE 7

The same kind of mixture as in Example 5 was obtained by using a hot roll mill in the same manner as in Example 5, excepting that the proportion of polystyrene was changed to 100 parts by weight. The mixture was further pressed into a plate by a hot press and a water cooled press as in Example 5. The plate had an Izod impact strength of 1.4 kg.cm/cm-notched and Rockwell hardness R of 122. The above-mentioned mixture had a melt viscosity of $6.5 \times 10^3$ poises and Vicat softening point of 99° C.

EXAMPLE 8

The same kind of mixture as in Example 5 was obtained by using a hot roll mill in the same manner as in Example 5, excepting that 20 parts by weight of polystyrene of Example 5 was replaced by 15 parts by weight of polystyrene (manufactured by Japan Polystyrene Mfg. Co. under a trade name "Esbrite No. 4") having a melt viscosity of $8.00 \times 10^2$ poises, Izod impact strength of 1.0 kg.cm/cm-notched, Vicat softening point of 93.2° C and Rockwell hardness R of 120. The mixture was further pressed into a plate by a hot press and a water cooled press as in Example 5. The plate had an Izod impact strength of 3.6 kg.cm/cm-notched and Rockwell hardness R of 122. The aforesaid mixture had a melt viscosity of $2.8 \times 10^5$ poises and Vicat softening point of 123° C.

EXAMPLE 9

The same kind of mixture as in Example 5 was obtained by using a hot roll mill in the same manner as in Example 5, excepting that 20 parts by weight of polystyrene of Example 5 was replaced by 30 parts of polystyrene (manufactured by Japan Polystyrene Mfg. Co. under a trade name "Esbrite No. 8") having a melt viscosity of $3.20 \times 10^3$ poises, Izod impact strength of 1.1 kg.cm/cm-notched, Vicat softening point of 99.0° C and Rockwell hardness R of 119. The mixture was further pressed into a plate by a hot press and a water cooled press as in Example 5. The plate had an Izod impact strength of 3.0 kg.cm/cm-notched and Rockwell hardness R of 123. The aforesaid mixture had a melt viscosity of $5.0 \times 10^4$ poises and Vicat softening point of 122° C.

EXAMPLE 10

The same kind of mixture as in Example 5 was obtained by using a hot roll mill in the same manner as in Example 5, excepting that 20 parts by weight of polystyrene of Example 5 was replaced by 20 parts by weight of methyl methacrylate resins (manufactured by Mitsubishi Rayon Mfg. Co. under a trade name "Acrypet M001") having a melt viscosity $2.75 \times 10^4$ poises, Izod impact strength of 1.1 kg.cm/cm-notched, Vicat softening point of 98° C and Rockwell hardness R of 132. The mixture was further pressed into a plate by a hot press and a water cooled press as in Example 5. the plate had an Izod impact strength of 4.1 kg.cm/cm-notched and Rockwell hardness R of 127. The above-mentioned mixture had a melt viscosity of $3.5 \times 10^5$ poises and Vicat softening point of 121° C.

EXAMPLE 11

The same kind of mixture as in Example 5 was obtained by using a hot roll mill in the same manner as in Example 5, excepting that 20 parts by weight of polystyrene of Example 5 was replaced by 20 parts by weight of acrylonitrile-styrene copolymer (manufactured by Asahi Dow Chemical Company under a trade name "Tyril 767") containing 23 percent by weight of acrylonitrile and having a melt viscosity of $3.0 \times 10^4$ poises, Izod impact strength of 1.3 kg.cm/cm-notched, Vicat softening point of 96.2° C and Rockwell hardness R of 122. The mixture was further pressed into a plate by a hot press and a water cooled press as in Example 5. The plate had an Izod impact strength of 3.5 kg.cm/cm-notched and Rockwell hardness R of 123. The aforesaid mixture had a melt viscosity of $3.6 \times 10^5$ poises and Vicat softening point of 124° C.

EXAMPLE 12

A 500 ml stainless steel autoclave provided with an electromagnetic stirrer was charged with 400 ml of water, 6g of tricalcium phosphate and 0.03g of sodium salt of dodecylbenzene sulfonic acid, followed by thorough stirring. The autoclave was further charged with a separately prepared solution of a mixture of 92g of methyl methacrylate, 108g of styrene monomer, 0.6g of t-butyl peroxybenzoate and 2.0g of t-dodecyl mercaptan, followed by purging with nitrogen gas.

The reaction system was first polymerized 3 hours at 120° C and then 2 hours at 140° C. After cooling, beads (polymer) were taken out. The polymer beads were washed with a 1l aqueous hydrochloric acid solution containing 5g of 35% hydrochloric acid while stirring was continued. After thoroughly washed with water, the polymer beads were dried 24 hours in a vacuum drier at 60° C, obtaining 185g of polymer material. The polymer was methyl methacrylate-styrene copolymer containing 46 percent by weight of methyl methacrylate. The copolymer had a melt viscosity of $4.81 \times 10^3$ poises, Izod impact strength of 1.3 kg.cm/cm-notched, Vicat softening point of 90.3° C and Rockwell hardness R of 121.

The same kind of mixture as in Example 5 was obtained by using a hot roll mill in the same manner as in Example 5, excepting that 20 parts by weight of the polystyrene of Example 5 was replaced by 30 parts by weight of the above-mentioned methyl methacrylate-styrene copolymer. The mixture was further pressed into a plate by a hot press and a water cooled press as in Example 5. The plate had an Izod impact strength of 2.9 kg.cm/cm-notched and Rockwell hardness R of 124. The aforesaid mixture had a melt viscosity of $2.41 \times 10^5$ poises and Vicat softening point of 122° C.

EXAMPLE 13

Polymerization was effected in the same manner as in Example 12, excepting that the solution of mixed components used in preparing said methyl methacrylate-styrene copolymer was replaced by that of a mixture of 110g of styrene, 40g of acrylonitrile, 50g of methyl methacrylate, 0.6g of t-butyl peroxybenzoate and 2.5g of t-butyl mercaptan. Upon completion of polymerization, after-treatment was made in the same manner as in Example 12, obtaining 165g of beads (polymer). The polymer was acrylonitrile-styrene-methyl methacrylate terpolymer containing 20 percent by weight of acrylonitrile, 55 percent by weight of styrene and 25 percent by weight of methyl methacrylate. The product terpolymer had a melt viscosity of $3.03 \times 10^3$ poises, Izod impact strength of 1.2 kg.cm/cm-notched, Vicat softening point of 93° C and Rockwell hardness R of 121.

The same kind of mixture as in Example 5 was obtained by using a hot roll mill in the same manner as in Example 5, excepting that 20 parts by weight of the polystyrene of Example 5 was replaced by 20 parts by weight of the above-mentioned acrylonitrile-styrene-methyl methacrylate terpolymer. The mixture was further pressed into a plate by a hot press and a water cooled press as in Example 5. The plate had an Izod impact strength of 3.1 kg.cm/cm-notched and Rockwell hardness R of 122. The above-mentioned mixture had a melt viscosity of $3.5 \times 10^5$ poises and Vicat softening point of 123° C.

EXAMPLE 14

Ring-opening polymerization was carried out in the same manner as in Example 5, excepting that the 5-cyano-bicyclo[2,2,1]-heptene-2 monomer of Example 5 was replaced by the same mols (1332g) of 5-cyano-5-methyl-bicyclo [2,2,1]-heptene-2. Upon completion of the ring-opening polymerization, purification was effected, obtaining 1100g of polymer material. This product polymer had an intrinsic viscosity of 0.77, Izod impact strength of 7.8 kg.cm/cm-notched, Vicat softening point of 148° C, Rockwell hardness R of 127 and melt viscosity of $1.6 \times 10^6$ poises.

The same kind of mixture as in Example 5 was obtained by using a hot roll mill at 190° C in the same manner as in Example 5, excepting that the polymer of 5-cyano-bicyclo[2,2,1]-heptene-2 prepared by ring-opening polymerization in Example 5 was replaced by the above-mentioned polymer of 5-cyano-5-methyl-bicyclo[2,2,1]-heptene-2 prepared similarly to ring-opening polymerization. The mixture thus obtained was further pressed into a plate by a hot press and a water cooled press as in Example 5. The plate had an Izod impact strength of 4.1 kg.cm/cm-notched and Rockwell hardness R of 125. The above-mentioned mixture had a melt viscosity of $3.6 \times 10^5$ poises and Vicat softening point of 142° C.

EXAMPLE 15

The same kind of mixture as in Example 14 was obtained by using a hot roll mill in the same manner as in Example 14, excepting that 20 parts by weight of the polystyrene of Example 14 was replaced by 20 parts by weight of the methyl methacrylate resins of Example 10. The mixture was further pressed into a plate by a hot press and a water cooled press as in Example 14. The plate had an Izod impact strength of 4.2 kg.cm/cm-notched and Rockewll hardness R of 124. The aforesaid mixture had a melt viscosity of $7.0 \times 10^5$ poises and Vicat softening point of 142° C.

EXAMPLE 16

The same kind of mixture as in Example 14 was prepared by using a hot roll mill in the same manner as in Example 14, excepting that 20 parts by weight of the polystyrene of Example 14 was replaced by 20 parts by weight of the acrylonitrile-styrene copolymer of Example 11. The mixture was further pressed into a plate by a hot press and a water cooled press as in Example 14. The plate had an Izod impact strength of 3.9 kg.cm/cm-notched and Rockwell hardness R of 125. The above-mentioned mixture had a melt viscosity of $7.1 \times 10^5$ poises and Vicat softening point of 144° C.

EXAMPLE 17

The same kind of mixture as in Example 14 was obtained by using a hot roll mill in the same manner as in Example 14, excepting that 20 parts by weight of the polystyrene of Example 14 was replaced by 20 parts by weight of the methyl methacrylate-styrene copolymer of Example 12. The mixture was further pressed into a plate by a hot press and a water cooled press as in Example 14. The plate had an Izod impact strength of 3.7 kg.cm/cm-notched and Rockwell hardness R of 124. The aforesaid mixture had a melt viscosity of $7.9 \times 10^5$ poises and Vicat softening point of 143° C.

EXAMPLE 18

Ring-opening polymerization was carried out in the same manner as in Example 5, except that 12 mol of 5-cyano-bicyclo[2,2,1]-heptene-2 used as a monomer in Example 5 was replaced by 10 mol (1192g) of 5-cyano-bicyclo[2,2,1]-heptene-2 and 2 mol (188g) of bicyclo[2,2,1]-heptene-2(norbornene). Upon completion of the ring-opening polymerization, purification was carried out in the same manner as in Example 5, obtaining 1164g of copolymer material. The product copolymer was substantially colorless and transparent and had an intrinsic viscosity of 0.67, Izod impact strength of 6.88 kg.cm/cm-notched, Vicat softening point of 122° C, Rockwell hardness R of 120 and melt viscosity of $5.70 \times 10^5$ poises.

Kneading was effected on a hot roll mill in the same manner as in Example 5, excepting that the polymer of 5-cyano-bicyclo[2,2,1]-heptene-2 prepared by ring-opening polymerization in Example 5 was replaced by the aforesaid copolymer prepared by ring-opening polymerization consisting of the 5-cyano-bicyclo[2,2,1]-heptene-2 and bicyclo[2,2,1]-heptene-2. The kneaded mixture was further pressed into a plate by a hot press and a water cooled press as in Example 5. The plate had an Izod impact strength of 3.4 kg.cm/cm-notched and Rockwell hardness R of 117. The above-mentioned mixture had a melt viscosity of $1.05 \times 10^5$ poises and Vicat softening point of 116° C.

EXAMPLE 19

80 parts by weight of 5-cyano-bicyclo[2,2,1]-heptene-2 polymer prepared by ring-opening polymerization in the same manner as in Example 5, 20 parts by weight of acrylonitrile-butadiene-styrene terpolymer (manufactured by Toray Industries, Inc. under a trade name "Toyolac 100") having an Izod impact strength of 28.5 kg.cm/cm-notched, Rockwell hardness R of 105 and Vicat softening point of 112° C and 0.5 part by weight of bis(2-hydroxy-3 -t-butyl-5-methyl phenyl) methane as a stabilizer were kneaded on a hot roll mill as in the same manner as in Example 5. The kneaded mixture was further hot pressed and then cold pressed into a plate 3 mm thick by a hot press and a water cooled press as in Example 5. The plate had an Izod impact strength of 30.5 kg.cm/cm-notched, Rockwell hardness R of 121 and Vicat softening point of 130° C.

EXAMPLE 20

Kneading was carried out on a hot roll mill in the same manner as in Example 19, excepting that the acrylonitrile-butadiene-styrene terpolymer of Example 19 amounted to 50 parts by weight and the 5-cyanobicyclo[2,2,1]-heptene-2 polymer prepared by ring-opening polymerization amounted to 50 parts by weight. The kneaded mixture was hot pressed and then cold pressed into a plate in the same manner as in Example 19. The plate had an Izod impact strength of 28.5 kg.cm/cm-notched, Vicat softening point of 127° C and Rockwell hardness R of 120.

EXAMPLE 21

Kneading was conducted on a hot roll mill in the same manner as in Example 19, excepting that the proportion of the acrylonitrile-butadiene-styrene terpolymer of Example 19 was changed to 70 parts by weight and the proportion of the 5-cyano-bicyclo[2,2,1]-heptene-2 polymer prepared by ring-opening polymerization was changed to 30 parts by weight. The kneaded mixture was hot pressed and then cold pressed into a plate in the same manner as in Example 19. The plate had an Izod impact strength of 30.3 kg.cm/cm-notched, Vicat softening point of 122° C and Rockwell hardness R of 115.

EXAMPLE 22

Kneading was carried out on a hot roll mill in the same manner as in Example 19, excepting that 20 parts by weight of the acrylonitrile-butadiene-styrene terpolymer of Example 19 was replaced by a terpolymer prepared for grafting styrene and acrylonitrile to chlorinated polyethylene (manufactured by Showa Denko K. K. under a trade name "NF-920") and having an Izod impact strength of 12.0 kg·cm/cm-notched, Rockwell hardness R of 104 and Vicat softening point of 97° C. The kneaded mixture was hot pressed and then cold pressed into a plate in the same manner as in Example 19. The plate had an Izod impact strength of 21.0 kg·cm/cm-notched, Vicat softening point of 125° C and Rockwell hardness R of 115.

EXAMPLE 23

Kneading was effected on a hot roll mill in the same manner as in Example 19, excepting that the acrylonitrile-butadiene-styrene terpolymer of Example 19 was replaced by a terpolymer prepared by grafting styrene and acrylonitrile to acrylic ester rubbers (manufactured by Hitachi Chemical Co. under a trade name "Vitax V-6101") and having an Izod impact strength of 10.0 kg·cm/cm-notched, Rockwell hardness R of 98 and Vicat softening point of 102° C. The kneaded mixture was hot pressed and then cold pressed into a plate in the same manner as in Example 19. The plate had an Izod impact strength of 11.5 kg·cm/cm-notched, Vicat softening point of 126° C and Rockwell hardness R of 119.

EXAMPLE 24

Kneading was conducted on a hot roll mill in the same manner as in Example 19, excepting that the acrylonitrile-butadiene-styrene terpolymer of Example 19 was replaced by a terpolymer prepared by grafting styrene and acrylonitrile to ethylene-propylene rubbers (manufactured by Toray Industries, Inc. under a trade name "WH-1000") and having an Izod impact strength of 9.3 kg·cm/cm-notched, Rockwell hardness R of 110 and Vicat softening point of 104° C. The kneaded mixture was hot pressed and then cold pressed into a plate in the same manner as in Example 19. The plate had an Izod impact strength of 15.4 kg·cm/cm-notched, Vicat softening point of 127° C and Rockwell hardness R of 120.

EXAMPLE 25

Kneading was conducted on a hot roll mill in the same manner as in Example 19, excepting that the acrylonitrile-butadiene-styrene terpolymer of Example 19 was replaced by a terpolymer prepared by grafting styrene and methyl methacrylate to butadiene rubbers (manufactured by Toray Industries, Inc. under a trade name "Toyolac 900") and having an Izod impact strength of 15.2 kg·cm/cm-notch, Rockwell hardness R of 99 and Vicat softening point of 106° C. The kneaded mixture was hot pressed and then cold pressed into a plate in the same manner as in Example 19. The plate had an Izod impact strength of 19.3 kg·cm/cm-notched, Vicat softening point of 126° C and Rockwell hardness R of 119.

EXAMPLE 26

A 1l autoclave was charged with 175 ml of distilled water, 125 ml of 2% aqueous polyvinyl alcohol solution, 5g of tricalcium phosphate and 0.025g of sodium salt of dodecylbenzene sulfonic acid, and thereafter with 40g of chlorinated polyethylene with 40 weight % chlorine content. The charged materials were thoroughly mixed at room temperature. The autoclave was further charged with the mixture of 104g of methyl methacrylate and 56g of styrene in which there were dissolved 0.32g of t-butyl peroxyacetate and 0.48g of t-dodecyl mercaptan. After the interior of the autoclave was substituted by nitrogen, copolymerization was carried out first 4 hours at 105° C and then 2 hours at 145° C. Upon completion of the copolymerization, the product was washed with an aqueous solution of hydrochloric acid and then with water, and vacuum dried overnight at 50° C. In this case, the yield of a product copolymer was 99.5%. The product was formed of slightly rough particles. Said graft copolymer had an Izod impact strength of 32.3 kg·cm/cm-notched, Vicat softening point of 103° C and Rockwell hardness R of 101.

Kneading was conducted on a hot roll mill in the same manner as in Example 19, excepting that the acrylonitrile-butadiene-styrene terpolymer was replaced by the graft copolymer (terpolymer) produced by the above-mentioned process. The kneaded mixture was hot pressed and then cold pressed into a plate in the same manner as in Example 19. The plate had an Izod impact strength of 29.3 kg·cm/cm-notched, Vicat softening point of 124° C and Rockwell hardness R of 121.

EXAMPLE 27

Kneading was carried out on a hot roll mill in the same manner as in Example 19, excepting that the acrylonitrile-butadiene-styrene terpolymer of Example 19 was replaced by a graft copolymer prepared by grafting styrene alone to butadiene rubbers (manufactured by Japan Polystyrene Mfg. Co. under a trade name "Esbrite 500A") and having an Izod impact strength of 12.2 kg·cm/cm-notched, Rockwell hardness R of 119 and Vicat softening point of 79.1° C. The kneaded mixture was hot pressed and then cold pressed into a plate in the same manner as in Example 19. The plate had an Izod impact strength of 21.3 kg·cm/cm-notched, Vicat softening point of 120° C and Rockwell hardness R of 120.

EXAMPLE 28

30 parts by weight of an impact-resistant compound consisting of 5 parts by weight of polybutadiene rubber (manufactured by Japan Synthetic Rubber Mfg. Co. under a trade name "BR-01") and 25 parts by weight of acrylonitrile-styrene copolymer (manufactured by Asahi Dow Chemical Company under a trade name "Tyril 767") and 70 parts by weight of the 5-cyano-bicyclo[2,2,1]-heptene-2 polymer prepared by ring-opening polymerization in Example 19 were kneaded on a hot roll mill in the same manner as in Example 19. The kneaded mixture was hot pressed and then cold pressed into a plate in the same manner as in Example 19. The plate had an Izod impact strength of 19.5 kg·cm/cm-notched, Vicat softening point of 121° C and Rockwell hardness R of 121.

EXAMPLE 29

Kneading was carried out on a hot roll press in the same manner as in Example 28, excepting that the impact-resistant compound of Example 28 was replaced by an impact-resistant compound consisting of 5 parts by weight of butadiene-acrylonitrile copolymer (manufactured by Japan Geon Co. under a trade name "Hycar 1042") and 25 parts by weight of polystyrene (manufactured by Japan Polystyrene Mfg. Co. under a trade name "Esbrite 2"). The kneaded mixture was hot pressed and then cold pressed into a plate in the same manner as in Example 28. The plate had an Izod impact strength of 14.3 kg·cm/cm-notched, Vicat softening point of 122° C and Rockwell hardness R of 120.

EXAMPLE 30

Kneading was carried out on a hot roll mill in the same manner as in Example 28, excepting that the impact-resistant compound of Example 28 was replaced by another impact-resistant compound consisting of 5 parts by weight of chlorinated polyethylene containing 40 percent by weight of chlorine (manufactured by Showa Denko K. K. under a trade name "Elaslen 401A") and 25 parts by weight of acrylonitrile-styrene copolymer (manufactured by Asahi Dow Chemical Company under a trade name "Tyril 767"). The kneaded mixture was hot pressed and then cold pressed into a plate in the same manner as in Example 28. The plate had an Izod impact strength of 19.3 kg·cm/cm-notched, Vicat softening point of 122° C and Rockwell hardness R of 119.

EXAMPLE 31

Kneading was effected on a hot roll mill in the same manner as in Example 28, excepting that the impact-resistant compound of Example 28 was replaced by another impact-resistant compound consisting of 7 parts by weight of the polybutadiene rubber of Example 28 and 23 parts by weight of methyl methacrylate-styrene copolymer containing 46 weight percent of methyl methacrylate. The kneaded mixture was hot-pressed and then cold pressed into a plate in the same manner as in Example 28. The plate had an Izod impact strength of 20.2 kg·cm/cm-notched, Vicat softening point of 121° C and Rockwell hardness R of 121.

EXAMPLE 32

The kneaded mixture was obtained by using a hot roll mill in the same manner as in Example 28, excepting that 50 parts by weight of the impact-resistant compound replaced by 30 parts by weight of the impact-resistant compound of Example 28 and consisting of 15 parts by weight of the polybutadiene and 35 parts by weight of the acrylonitrile-styrene copolymer both of Example 28 and 50 parts by weight of the 5-cyano-bicyclo [2,2,1]-heptene-2 polymer prepared by ring-opening polymerization in Example 19 were kneaded. The kneaded mixture was hot pressed and then cold pressed into a plate in the same manner as in Example 28. The plate had an Izod impact strength of 43.9 kg·cm/cm-notched, Vicat softening point of 116° C and Rockwell hardness R of 115.

EXAMPLE 33

Kneading was carried out on a hot roll mill in the same manner as in Example 32, excepting that the impact-resistant compound of Example 32 was replaced by another heat-resistant compound consisting of 15 parts by weight of the acrylonitrile-butadiene-styrene terpolymer of Example 19, 10 parts by weight of the chlorinated polyethylene and 25 parts by weight of the acrylonitrile-styrene copolymer both of Example 30. The kneaded mixture was hot pressed and then cold pressed into a plate in the same manner as in Example 32. The plate had an Izod impact strength of 73.5 kg·cm/cm-notched, Vicat softening point of 132° C and Rockwell hardness R of 120.

EXAMPLE 34

Kneading was effected on a hot roll mill in the same manner as in Example 28, excepting that the impact-resistant compound of Example 28 was replaced by another impact-resistant compound consisting of 5 parts by weight of the acrylic ester rubbers (manufactured by Japan Zeon Company under a trade name "Hycar 4021") and 25 parts by weight of the acrylonitrile-styrene copolymer of Example 28. The kneaded mixture was hot pressed and then cold pressed into a plate in the same manner as in Example 28. The plate had an Izod impact strength of 19.3 kg·cm/cm-notched, Vicat softening point of 122° C and Rockwell hardness R of 119.

EXAMPLE 35

Kneading was carried out on a hot roll mill at 190° C in the same manner as in Example 19, excepting that the 5-cyano-bicyclo[2,2,1]-heptene-2 polymer prepared by ring-opening polymerization in Example 19 was replaced by the 5-cyano-5-methyl-bicyclo[2,2,1]-heptene-2 polymer prepared by ring-opening polymerization in Example 14. The kneaded mixture was hot pressed and then cold pressed into a plate in the same manner as in Example 19. The plate had an Izod impact strength of 43.1 kg·cm/cm-notched, Vicat softening point of 140° C and Rockwell hardness R of 125.

EXAMPLE 36

Kneading was effected on a hot roll mill in the same manner as in Example 35, excepting that the acrylonitrile-butadiene-styrene terpolymer of Example 35 was replaced by the terpolymer of Example 22. The kneaded mixture was hot pressed and then cold pressed into a plate in the same manner as in Example 35. The plate had an Izod impact strength of 30.1 kg·cm/cm-notched, Vicat softening point of 137° C and Rockwell hardness R of 123.

EXAMPLE 37

The kneaded mixture was obtained by using a hot roll mill in the same manner as in Example 35, excepting that 30 parts by weight of an impact-resistant compound replaced by 20 parts by weight of the acrylonitrile-butadiene-styrene terpolymer of Example 35 and consisting of 7 parts by weight of the polybutadiene rubber and 23 parts by weight of the acrylonitrile-styrene copolymer both of Example 28 and 70 parts by weight of the 5-cyano-5-methyl-bicyclo[2,2,1]-heptene-2 polymer prepared by ring-opening polymerization in Example 35 were kneaded. The kneaded mixture was hot pressed and then cold pressed into a plate in the same manner as in Example 35. The plate had an Izod impact strength of 24.1 kg·cm/cm-notched, Vicat softening point of 135° C and Rockwell hardness R of 120.

EXAMPLE 38

Kneading was conducted on a hot roll mill in the same manner as in Example 19, excepting that the 5-cyano-bicyclo[2,2,1]-heptene-2 polymer prepared by ring-opening polymerization in Example 19 was replaced by the 5-cyano-bicyclo[2,2,1]-heptene-2/bicyclo[2,2,1]-heptene-2 copolymer prepared by ring-opening polymerization in Example 18. The kneaded mixture was hot pressed and then cold pressed into a plate in the same manner as in Example 19. The plate had an Izod impact strength of 13.5 kg·cm/cm-notched, Vicat softening point of 116° C and Rockwell hardness R of 122.

What we claim is:

1. Resin compositions comprising 5 to 90 parts by weight of homopolymer prepared by ring-opening polymerization of 5-cyano bicyclo[2,2,1]-heptene-2 and 95 to 10 parts by weight of polyvinyl chloride resin selected from the group consisting of vinyl chloride homopolymer, vinyl chloride-vinyl acetate copolymers, vinyl chloride-ethylene copolymers, vinyl chloride-propylene copolymers and vinyl chloride-vinyl ether copolymers.

2. Resin compositions comprising 10 to 80 parts by weight of homopolymer prepared by ring-opening polymerization of 5-cyano bicyclo[2,2,1]-heptene-2 and 90 to 20 parts by weight of polyvinyl chloride selected from the group consisting of vinyl chloride homopolymer and copolymer of vinyl chloride.

3. Resin compositions according to claim 2 wherein the copolymer of vinyl chloride is selected from the group consisting of vinyl chloride-vinyl acetate copolymers, vinyl chloride-ethylene copolymers, vinyl chloride-propylene copolymers and vinyl chloride-vinyl ether copolymers.

* * * * *